United States Patent [19]

Teraoka

[11] Patent Number: 4,762,021

[45] Date of Patent: Aug. 9, 1988

[54] TRANSFER CASE FOR FOUR-WHEEL-DRIVE VEHICLES

[75] Inventor: Masao Teraoka, Tochigi, Japan

[73] Assignee: Tochigifujisangyo Kabushikigaisha, Tochigi, Japan

[21] Appl. No.: 921,797

[22] Filed: Oct. 17, 1986

Related U.S. Application Data

[63] Continuation of Ser. No. 651,112, Sep. 17, 1984, abandoned.

[30] Foreign Application Priority Data

Sep. 27, 1983 [JP] Japan ................................ 58-176887
Oct. 20, 1983 [JP] Japan ................................ 58-161367

[51] Int. Cl.[4] ................................ F16H 37/06

[52] U.S. Cl. ................................ 74/665 GA; 74/665 GE; 180/247; 180/248; 192/93 A

[58] Field of Search ................................ 74/665 GA, 665 GE; 180/247, 248, 249; 192/93 A, 55, 54

[56] References Cited

U.S. PATENT DOCUMENTS

| | | | |
|---|---|---|---|
| 3,605,523 | 9/1971 | O'Brien | 74/711 |
| 3,656,573 | 4/1972 | Halberg | 180/249 |
| 3,791,501 | 2/1974 | Culbertson | 192/93 A |
| 3,827,520 | 8/1974 | Mueller | 180/249 |
| 3,993,152 | 11/1976 | Fogelberg | 180/249 |
| 4,132,297 | 1/1979 | Brown et al. | 180/248 X |
| 4,185,723 | 1/1980 | Kelbel | 180/247 X |
| 4,281,749 | 8/1981 | Fogelberg | 180/247 X |
| 4,286,686 | 9/1981 | Franke | 180/248 X |
| 4,290,321 | 9/1981 | Wilson | 192/93 A |
| 4,298,085 | 11/1981 | Moroto et al. | 180/249 X |
| 4,458,557 | 7/1984 | Hayakawa | 180/247 |
| 4,466,502 | 8/1984 | Sakai | 180/248 X |
| 4,545,456 | 10/1985 | Lake | 180/247 X |

FOREIGN PATENT DOCUMENTS

| | | | |
|---|---|---|---|
| 48304 | 4/1983 | European Pat. Off. | 180/247 |
| 2331980 | 2/1974 | Fed. Rep. of Germany | 180/249 |
| 2089000 | 6/1982 | United Kingdom . | |

*Primary Examiner*—Dirk Wright
*Attorney, Agent, or Firm*—Samuels, Gauthier et al.

[57] ABSTRACT

A transfer case for four-wheel-drive vehicles for distribution of the power from an input shaft through a transmission route to the rear propeller shaft and the front propeller shaft is shown. The transfer case is provided with a torque detection unit for detecting the torque on the input shaft side and is equipped also, on the transmission route between the rear propeller shaft side and the front propeller shaft side, a friction clutch whose coupling force is adjusted in accordance with the variations in the values of the torque detected by the torque detection unit.

4 Claims, 4 Drawing Sheets

21
15a 25 33 21a 21b
19a 27 27a
19
15
23
29
17
31

TRANSFER CASE FOR FOUR-WHEEL-DRIVE VEHICLES

This is a continuation of co-pending application Ser. No. 651,112, now abandoned, filed on 09/17/84.

BACKGROUND OF THE INVENTION

1. Field of the Invention

The present invention relates to a transfer case (power distribution device) for four-wheel-drive vehicles.

2. Description of the Prior Art

As commonly used, there exists two types of transfer cases which are attached to the rear of the speed change gears, one with a center differential gear and the other without a differential gear.

An example of the conventional type is shown in FIG. 1. In this type, the power from an input shaft 101 is transmitted and distributed to the front propeller shaft 105 and the rear propeller shaft 107 via a transmission route 103. It is so arranged that the high speed range and the low speed range can be accomplished by coupling a first sleeve 109, which is installed within the transmission route 103, to the high speed gear 113 and the low speed gear 111, respectively, that are located on both sides of the sleeve 109. Furthermore, drive on the rear wheels alone can be realized by moving toward right to decouple a second sleeve 115 which is disengageable from the front propeller shaft 105.

In this type of transfer case 117, even if either of the front or rear wheels find themselves in a slipping situation, when the front wheel side and the rear wheel side are in the directly connected state while the vehicle is in the four-wheel-driving condition, there will be secured a sufficiently strong tractability even on a low-friction road surface, thanks to the distribution of the driving power in proportion to the gripping capability of the tires. On the other hand, during turn of the vehicle, there will arise a difference in rotations between the front wheels which require larger turn radius and the rear wheels which can do with smaller turn radius. This difference in rotations shows itself up as the torsional stress in the transmission route 103 producing torque. The torsional stress affects the driving system, for example, deteriorating the driving capability substantially. In particular, in the case of turning at a low speed, such as occurs in garaging a vehicle, the input torque succumbs to the torsional stress so that the vehicle will be brought to a stop under a circumstance similar to the one in which brakes are applied to the driving system. In addition, there remains undesirable features such as the overloading of the driving system, abnormal friction on tires, and an excessive force required for steering. In such a case, these problems will be resolved by switching to the two-wheel-drive. However, switching in the midst of garaging a vehicle or the like situation is troublesome, and also there will be required a fairly large power for such a switching.

On the other hand, in the transfer case 119 of the conventional type which can eliminate the rotation difference that occurs in such a case as turning, the power from the input shaft 101 is transmitted, as shown in FIG. 2, for example, to the front propeller shaft 105 and the rear propeller shaft 107, via a transmission route 103. Here, however, there is required a center differential gear 121 (a differential device) midway in the transmission route 103, in order to allow for the difference in rotations of the front propeller shaft 105 and the rear propeller shaft 107. The center differential gear 121 comprises a small differential gear shaft 123 which is incorporated into the input shaft 101, a small differential gear 125 which is mounted on the shaft 123, and a large differential gear 127 which engages with the small gear 125 and is incorporated into the rear propeller shaft 107. Thus, for example, by moving a sleeve 129, which is arranged in the prior stage of the input shaft 101, toward the right, it becomes possible to engage the sleeve with the spline of an output gear 131. This allows the transmission of the power, as shown by the thick arrowed line in the figure, to the output gear 131, the sleeve 129, and the input shaft 101 via an intermediate gear 135 which is engaged with an input gear 133, making the low speed range available for the system. At the same time, the power is transmitted, through the center differential 123, to the front propeller shaft 105 and the rear propeller shaft 107.

While the center differential 123 possesses an advantage of permitting to absorb the rotation difference which arises in turning the vehicle, it reveals a weakness in that, when the front wheels spin in a marsh or the like, the power from the input shaft 101 is consumed mainly for spinning the front wheels at a high speed, with little transmission of power to the rear wheels, which necessitates an inclusion of a differential locking mechanism into the system. Consequently, it will lead to a high cost and large size of the system which is undesirable in view of the contemporary trend for miniaturization and light weight for the products.

SUMMARY OF THE INVENTION

An object of the present invention is to provide a transfer case for four-wheel-drive vehicles which, possessing the function of a center differential with differential locking mechanism, allows for reduction in size and weight of the device.

In order to achieve the above object for the present invention, there is installed, in the transmission route for distributing the power from the input shaft to the front propeller shaft and the rear propeller shaft, a torque detection unit for detecting the torque on the input shaft. Installed also between the front propeller shaft side and the rear propeller shaft side is a friction clutch whose binding force is adjusted in accordance with the variations in the values of the detected torque which is sent from the torque detection unit.

Briefly described, in the transfer device according to the present invention, it is possible to achieve both functions of center differential and differential locking, without actually requiring installation of a center differential gear with differential locking mechanism, through introduction of a simple structure which involves a friction clutch whose binding force is adjusted in proportion to the variations in the input torque. Because of this, in an operation such as garaging a vehicle, there will occur no phenomenon, even without performing the troublesome switching from the four-wheel to the two-wheel drive, in which the torsional stress acts as brakes on the driving system, making it possible to expect a smooth handling of the vehicle in such an operation. At the same time, it is possible to transmit the power effectively to the remaining nonslipping wheels should either of the front or rear wheels begin to slip.

DESCRIPTION OF THE PREFERRED EMBODIMENTS

Figure 1:
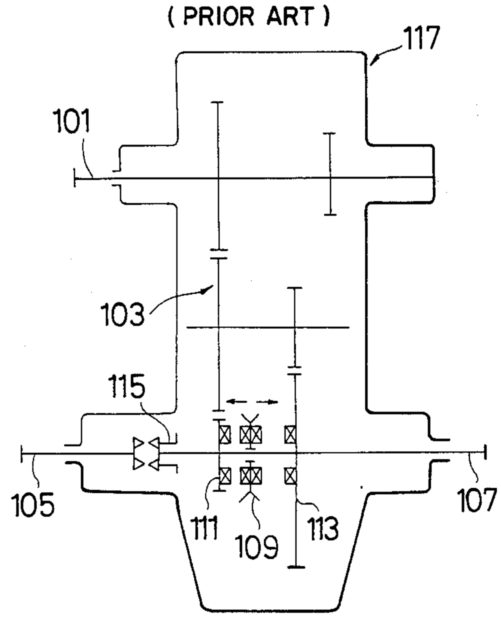
FIGS. 1 and 2 are cross section views of conventional transfer cases.
Figure 2:
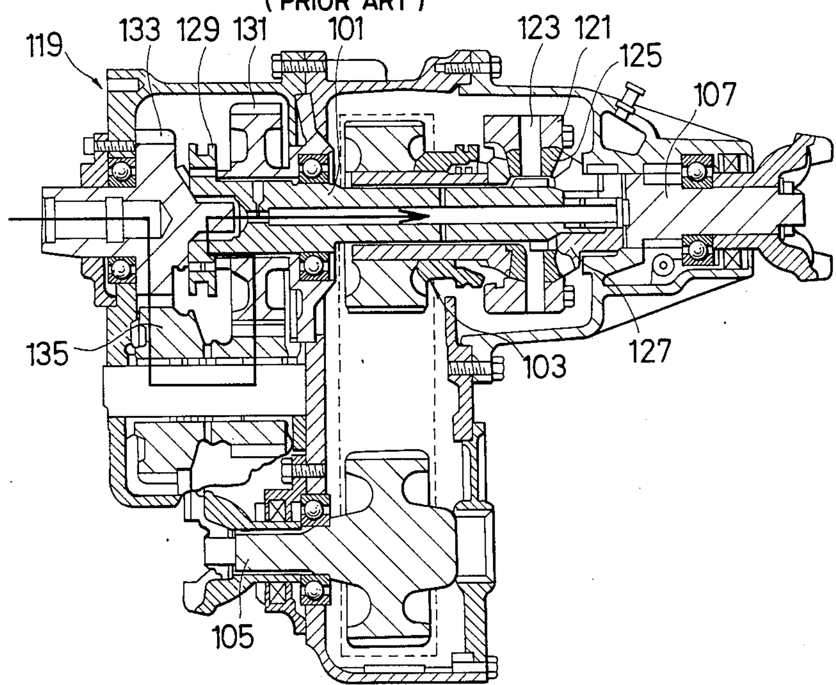
Figure 3:
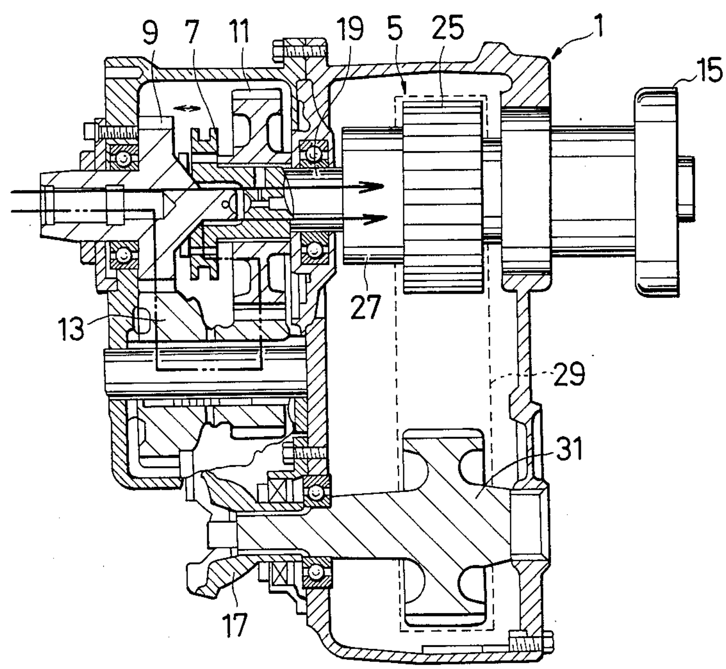
FIG. 3 is a cross section view of an embodiment of the transfer case in accordance with the present invention.
Figure 4:
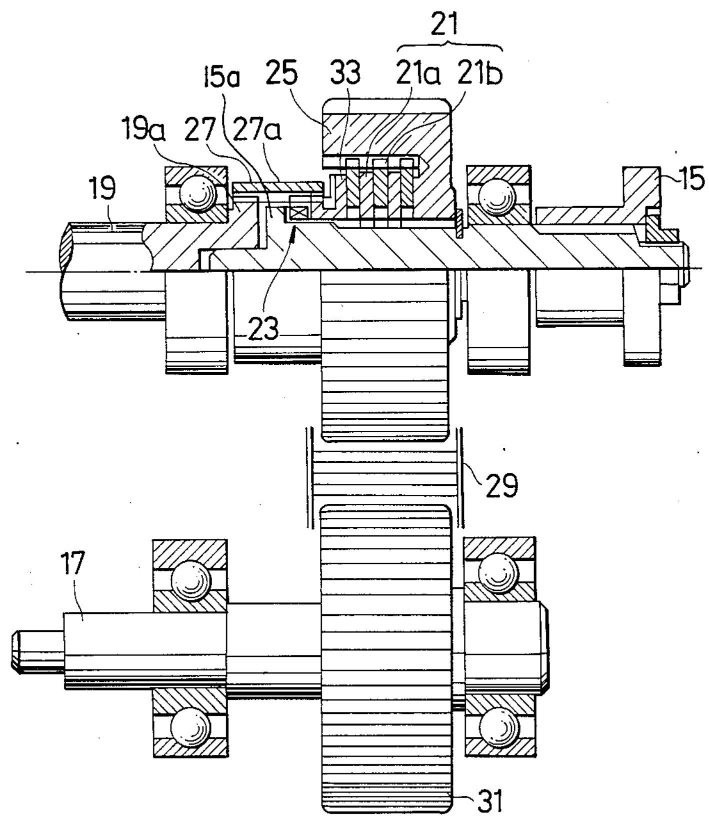
FIG. 4 is an enlarged partial view showing the major portion of the device shown in FIG. 3.
Figure 5:
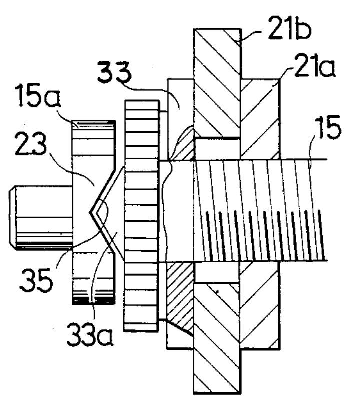
FIGS. 5, 5A and 6 are explanatory view showing the operation of a torque detection mechanism in accordance with the present invention.

Referring to FIGS. 3 through 6, an embodiment of the present invention will be described in detail. In the figures, a transfer case 1 is arranged in the rear of a speed change gear (not shown in the figures) and driving power is distributed to rear and front propeller shafts 15, 17 at a portion 5. In the prior stage of the distribution route 5, there are mounted on the shaft a slidable moving sleeve 7, an input gear 9 and an output gear 11 which can be brought to engagement through sliding (in the direction of the arrow) of the sleeve 7, and an auxiliary shaft gear 13 which is engaged all the time to the gears 9 and 11. It is so arranged as to obtain the high speed range (solid line) by bringing the moving sleeve 7 to an engagement with the input gear 9, while the low speed range (broken line) becomes available by engaging the moving sleeve 7 with the output gear 11.

At the same time, the powers for the high speed range and the low speed range that are obtained by shifting the moving sleeve 7, are transmitted to the rear propeller shaft 15 and the front propeller shaft 17, respectively, via the distribution route 5. On the distribution route 5, there are installed a friction clutch 21 for coupling and decoupling the input shaft 19 and the rear propeller shaft 15, of the distribution route 5, a torque detection unit 23 which controls freely the coupling and decoupling of the clutch 21, and a pressure cam unit 33. The friction clutch 21 consists of a plurality of movable torque units **21*a* that are splined on to the rear propeller shaft 15, and fixed clutch units 21*b* that are mounted on the inside of the transmission wheel 25 opposite to the clutch units 21*a*. Furthermore, the pressure cam unit 33 for pressing the clutch units is in the transmissible state with the input shaft 19 via a fixed sleeve 27. One end of the spline 27*a* which is being formed on the inside of the fixed sleeve 27 is coupled with the flange 19*a* of the input shaft 19, while the other end is coupled with the prwessure cam unit 33 which is located at the front end of the friction clutch 21. In this manner, the input shaft 19 and the rear propeller shaft 15 can rotate integrally. The transmission wheel 25 having the clutch unit 21*b* and a transmission wheel 31 formed on the front propeller shaft 17 are in the transmissible state through a transmission belt 29**.

Figure 6:
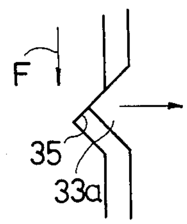
Figure 5A:
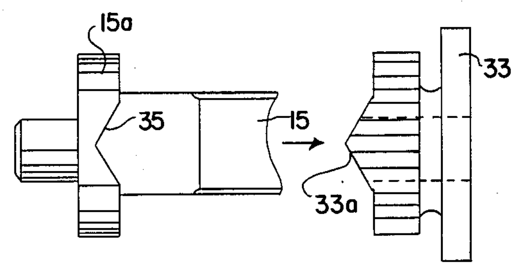

The torque detection unit 23 comprises a plurality of cam proturberances **33*a* formed on the axial portion of the pressure cam unit 33 and cam recesses 35 formed on the flange 15*a* of the rear propeller shaft 15 and engaged with the cam protuberances 33*a*. The cam protuberance 33*a* rises in a hill shape so as to be urged rightwardly (in the direction of the arrow) by a rotary force F as shown in FIG. 6**.

In the above mentioned construction, when torque transmitted from the input shaft 19 is large, the cam protuberances **33*a* are urged to slide in an axial direction (indicated by the arrow in FIG. 6) by the same recesses 35. In this manner, the movable clutch units 21*a* come into contact with the fixed clutch unit 21*b* under pressure. Driving power from the input side is eventually transmitted to both the front propeller shaft 15 and the rear propeller shaft 17 via the clutch 21**, rendering the vehicle in four-wheel driving condition.

Next, when the rotational torque of the input shaft 19 is small, the push along the shaft direction due to the cam protuberances **33*a* of the torque detection unit 23 is restricted by the cam recesses 35. Because of this, the movable clutch units 21*a* make a weak contact with, and slide over, the fixed clutch units 21*b*. Consequently, during the turn of a vehicle, there occurs no tortional stress due to rotational difference between the front propeller shaft 17 and the rear propeller shaft 15**, making it possible to accomplish a smooth turn for the vehicle.

Figure 7:
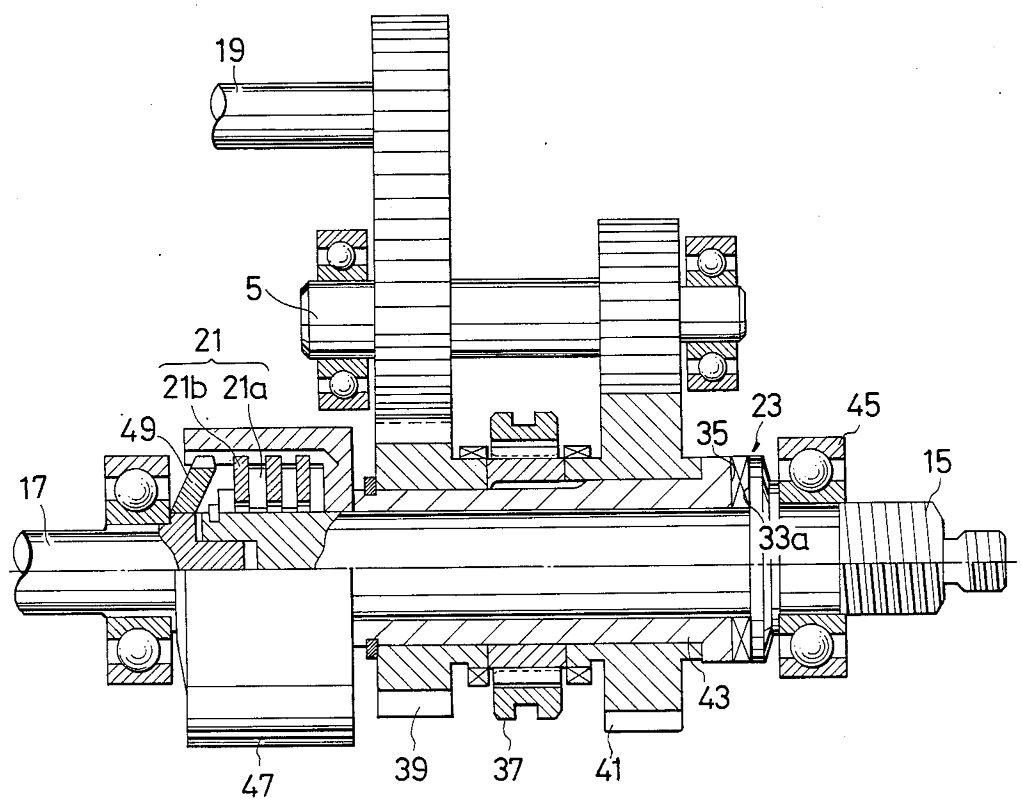
FIG. 7 is an enlarged partial view, similar to FIG. 4, of another embodiment of the transfer case in accordance with the present invention.

FIG. 7 shows a modification of the embodiment described in the foregoing. In this embodiment of the invention, there are installed the following units in the transmission unit 5 for transmitting the power from the side of the input shaft 19 to the rear propeller shaft 15 and the front propeller shaft 17. Namely, they are a high speed gear 39 and a low speed gear 41 which provide the high speed range and the low speed range, respectively, upon engagement with a movable sleeve 37, a torque detection unit 23 which detects the torque for the high speed range and the low speed range, and a friction clutch 21 which connects and disconnects the the rear propeller shaft 17 and the rear propeller shaft 15 in response to the values of the torque detected by the torque detection unit 23. The torque detection unit 23 consists of a cam protuberance **33*a* of hill form which is similar to the one in the previous embodiment and a cam recess 35 which couples with the cam protuberance 33*a*. The cam recess 35 is provided around the rear propeller shaft 15 and is formed on the supporting cylinder 43 on which are mounted the high and low speed gears 39 and 41, respectively, and the movable sleeve 37**.

On the other hand, the friction clutch consists of the fixed clutch units **21*b* and the movable clutch units 21*a*, and the movable clutch units are mounted on the rear propeller shaft 15, while the fixed clutch units 21*b* are mounted on the clutch housing 47 by spline engagement. The clutch housing 47 is extended toward the side of the front propeller shaft 17, and its extended edge is supported by the arm 49 which stretches from the front propeller shaft 17**.

Accordingly, when the torque that is applied to the torque detection unit 23 is large, the cam protuberance **33*a* is pushed out by the cam recess 35, pressing the movable clutch units 21*a*. On the other hand, when the torque is small, the pushing force of the cam recess 35 on the cam protuberance 33*a* becomes weak, with correspondingly weak pressing force on the movable clutch units 21*a*** which undergoes slips. As a result, no torsional stress will arise due to the difference in rotations of the front and rear wheels.

Figure 8:
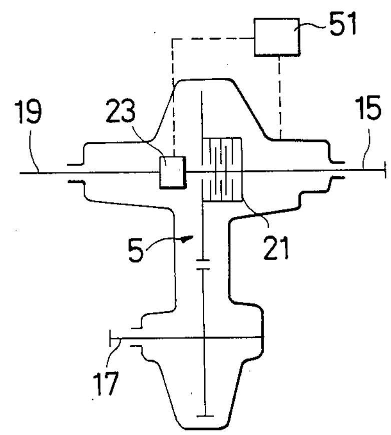
FIG. 8 is a simplified diagram showing a modified example of the transfer device.

In FIG. 8 is sketched another embodiment in which the clutch 21 is controlled by the oil pressure or mechanical, electrical, or other control means 51. The control device 51 is so arranged as to control the pressing force on the clutch units in proportion to the value of the torque detected by the torque detection unit 23. Since the other components are identical to the existing examples, further explanation will be omitted by simply attaching the indentical reference numerals.

What is claimed is:

1. A transfer mechanism for distributing driving torque from an input shaft to the front wheel and rear wheel propeller shafts of a four-wheel-drive vehicle, said mechanism comprising:

first means for establishing a drive connection between said input shaft and one of said propeller shafts, said first means including torque detector means for detecting the level of torque being transmitted by said input shaft to the said one propeller shaft;

second means for establishing a drive connection between the said one propeller shaft and the other of said propeller shafts, said second means including a clutch having frictionally engageable elements arranged to develop a coupling force between said propeller shafts, said elements being mutually adjustable in response to the torque level being detected by said torque detecting means to thereby vary said coupling force, said elements being mutually rotatable at lower detected torque levels to thereby accommodate differential rotation between said propeller shafts, said input shaft and said one propeller shaft being arranged on the same axis and said other propeller shaft being offset on a parallel axis.

2. The transfer mechanism of claim 1 further comprising:

transmission wheels provided respectively on said rear and front propeller shafts, a transmission belt trained over said transmission wheels, said detector being arranged within said transmission wheel on said rear propeller shaft.

3. The transfer mechanism of claim 2, wherein, said transmission wheel of said rear propeller shaft is formed with a bore in which are provided at least one fixed clutch disc fixed on the inside of said bore and at least one movable clutch disc opposite to said fixed clutch disc and slidable in the axial direction to couple with said fixed clutch disc, said movable clutch disc being rotatable with said rear propeller shaft.

4. The transfer mechanism of claim 3, wherein said movable clutch disc is formed with a hill shaped cam and said rear propeller shaft is provided with a flange which is formed with a recessed portion which mates with said hill shaped cam when no torque is produced.

* * * * *